(12) United States Patent
Ding (10) Patent No.: US 8,707,219 B2
(45) Date of Patent: Apr. 22, 2014

(54) METHOD AND APPARATUS FOR UNLOCKING SCREEN SAVER

(71) Applicant: Huawei Device Co.,Ltd., Shenzhen (CN)

(72) Inventor: Yi Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/710,020

(22) Filed: Dec. 10, 2012

(65) Prior Publication Data

US 2014/0033142 A1     Jan. 30, 2014

Related U.S. Application Data

(63) Continuation of application No. PCT/CN2012/079304, filed on Jul. 27, 2012.

(51) Int. Cl.
    *G06F 3/00*     (2006.01)
(52) U.S. Cl.
    USPC .......................................... 715/867; 715/863
(58) Field of Classification Search
    USPC ................. 715/863, 867, 864, 769, 859–862; 345/473–475
    See application file for complete search history.

(56) References Cited

U.S. PATENT DOCUMENTS

| | | | | |
|---|---|---|---|---|
| 8,127,141 B2* | 2/2012 | Hypponen | ..................... | 713/184 |
| 8,146,021 B1* | 3/2012 | Asente | .......................... | 715/863 |
| 8,355,698 B2* | 1/2013 | Teng et al. | ..................... | 455/411 |
| 2003/0069892 A1* | 4/2003 | Hind et al. | ................. | 707/103 X |
| 2003/0069900 A1* | 4/2003 | Hind et al. | ..................... | 707/200 |
| 2004/0075701 A1* | 4/2004 | Ng | ................................. | 345/867 |
| 2005/0125739 A1* | 6/2005 | Thompson et al. | ........... | 715/778 |
| 2005/0253817 A1* | 11/2005 | Rytivaara et al. | ............. | 345/173 |
| 2010/0125819 A1* | 5/2010 | Sudhakar | ....................... | 715/867 |
| 2011/0197263 A1* | 8/2011 | Stinson, III | ....................... | 726/4 |
| 2011/0256848 A1* | 10/2011 | Bok et al. | ....................... | 455/411 |
| 2011/0316797 A1* | 12/2011 | Johansson | ..................... | 345/173 |
| 2012/0084651 A1* | 4/2012 | Miller et al. | ................... | 715/716 |
| 2012/0194440 A1* | 8/2012 | Ramrattan et al. | ............ | 345/173 |
| 2012/0252410 A1* | 10/2012 | Williams | ...................... | 455/411 |
| 2012/0289201 A1* | 11/2012 | Ding | ............................. | 455/411 |
| 2013/0174094 A1* | 7/2013 | Heo et al. | ....................... | 715/835 |

FOREIGN PATENT DOCUMENTS

CN          101393511 A       3/2009
CN          101907968 A      12/2010

OTHER PUBLICATIONS

International Search Report and Written Opinion of the International Searching Authority issued in corresponding PCT Patent Application No. PCT/CN2012/079304, mailed Sep. 6, 2012.

* cited by examiner

*Primary Examiner* — Steven Sax
(74) *Attorney, Agent, or Firm* — Staas & Halsey LLP (57) ABSTRACT

A method for unlocking a screen saver includes: when a screen is in a screen saver state, receiving a motion track input by a user on the screen; and when the motion track crosses boundaries of a first area and a second area of the screen at least two times, enabling the screen to exit the screen saver state. With the above technical solutions, characteristics of the motion track on the screen are detected, for example, the number of times of crossing the boundaries of the first area and second area of the screen; therefore, the screen saver can be unlocked based on the flexibly input motion track, so that the screen saver can be unlocked more flexibly.

9 Claims, 8 Drawing Sheets

METHOD AND APPARATUS FOR UNLOCKING SCREEN SAVER

CROSS-REFERENCE TO RELATED APPLICATIONS

This application is a continuation of International Application PCT/CN2012/079304, filed on Jul. 27, 2012, which is hereby incorporated by reference in its entireties

FIELD OF THE INVENTION

The present invention relates to the user equipment field, and in particular, to a method and an apparatus for unlocking a screen saver.

BACKGROUND OF THE INVENTION

With the development of technologies, various user equipments have emerged. Various user equipments not only increasingly highlight personalities by their shapes, but also show personalized development in the application field. These personalized applications each own a batch of loyal users.

To avoid misoperation or save power, a screen saver is usually set for a user equipment, and the user equipment can perform subsequent operations only after the screen saver is unlocked. At present, the operation of unlocking the screen saver is not flexible for the user equipment, for example, a user can unlock the screen saver only by dragging a specified icon in an interface. The user expects to use a more flexible unlocking mode.

SUMMARY OF THE INVENTION

In view of disadvantages of the prior art, embodiments of the present invention provide a method and an apparatus for unlocking a screen saver to solve the problem that a user expects to use a more flexible unlocking mode.

In one aspect, a method for unlocking a screen saver is provided and includes: when a screen is in a screen saver state, receiving a motion track input by a user on the screen; and when the motion track crosses boundaries of a first area and a second area of the screen at least two times, enabling the screen to exit the screen saver state.

In a first possible implementation manner, the first area of the screen is an annular zone extending from an edge of the screen to the center of the screen.

In combination with the first aspect or the first possible implementation manner of the first aspect, in a second possible implementation manner, a start point of the motion track is located in the first area of the screen.

In combination with the second possible implementation manner of the first aspect, in a third possible implementation manner, before unlocking the screen saver, the method further includes: detecting a linear distance between the start point of the motion track and another point of the motion track; and when the linear distance between the start point of the motion track and the another point of the motion track exceeds a threshold, enabling the screen to present a preset animation effect with extension of the motion track.

In combination with the third possible implementation manner of the first aspect, in a fourth possible implementation manner, after the screen presents the preset animation effect, the method further includes: when the screen exits the screen saver state, enabling the screen to end the preset animation effect.

In combination with the first aspect and any one of the above possible implementation manners, in a fifth possible implementation manner, after enabling the screen to end the preset animation effect when the motion track extends to an end point, the method further includes: when the screen exits the screen saver state, enabling the screen to present an interface before startup of the screen saver or a main interface.

In combination with the first aspect and any one of the above possible implementation manners, in a sixth possible implementation manner, the method further includes: when the screen is in the screen saver state, presenting the first area of the screen and the second area of the screen distinctively on the screen.

In combination with the first aspect and any one of the above possible implementation manners, the screen is a touch screen, and accordingly, the motion track is a touch track input by the user on the touch screen.

In a second aspect, an apparatus for unlocking a screen saver is provided and includes a receiving unit and a screen saver unit, where: the receiving unit is configured to: when a screen is in a screen saver state, receive a motion track input by a user on the screen, and send the motion track to the screen saver unit; and the screen saver unit is configured to enable the screen to exit the screen saver state when the motion track received by the receiving unit crosses boundaries of a first area and a second area of the screen at least two times.

In a first possible implementation manner, a detecting unit is also included, where the first area of the screen is an annular zone extending from an edge of the screen to the center of the screen.

In combination with the second aspect or the first possible implementation manner of the second aspect, in a second possible implementation manner, a start point of the motion track received by the receiving unit is located in the first area of the screen.

In combination with the second possible implementation manner of the second aspect, in a third possible implementation manner, the apparatus further includes a detecting unit, where the detecting unit is configured to detect a linear distance between the start point of the motion track and another point of the motion track; and when the linear distance between the start point of the motion track and the another point of the motion track exceeds a threshold, enable the screen to present a preset animation effect with extension of the motion track.

In combination with the third possible implementation manner of the second aspect, in a fourth possible implementation manner, the screen saver unit is further configured to: when the screen exits the screen saver state, enable the screen to end the preset animation effect.

In combination with the second aspect and any one of the above possible implementation manners, in a fifth possible implementation manner, the screen saver unit is further configured to: when the screen exits the screen saver state, enable the screen to present an interface before startup of the screen saver or a main interface.

In combination with the second aspect and any one of the above possible implementation manners, in a sixth possible implementation manner, the screen saver unit is further configured to: when the screen is in the screen saver state, enable the screen to present the first area of the screen and the second area of the screen distinctively.

In combination with the second aspect and any one of the above possible implementation manners, in a seventh possible implementation manner, the screen is a touch screen, and accordingly, the motion track is a touch track input by the user on the touch screen.

In a third aspect, an apparatus for unlocking a screen saver is provided and includes a display, an input apparatus, a memory, and a processor, where: the display is configured to receive an instruction of the processor, and enable a screen of the display to present a graphical user interface; the input apparatus is configured to: when the screen is in a screen saver state, receive a motion track input by a user on the screen and send the motion track to the memory, or receive the motion track input by the user on the screen and send the motion track to the processor which then sends the motion track to the memory; the processor is configured to receive the motion track sent by the input apparatus, and when the motion track crosses boundaries of a first area and a second area of the screen at least two times, enable the screen of the display to exit the screen saver state or send the motion track to the memory; and the memory is configured to store the motion track sent by the input apparatus or the motion track sent by the processor.

In a first possible implementation manner, the first area of the screen is an annular zone extending from an edge of the screen to the center of the screen.

In combination with the third aspect or the first possible implementation manner of the third aspect, in a second possible implementation manner, the processor is further configured to determine that a start point of the motion track is located in the first area of the screen.

In combination with the second possible implementation manner of the third aspect, in a third possible implementation manner, the processor is further configured to detect a linear distance between the start point of the motion track and another point of the motion track; and when the linear distance between the start point of the motion track and the another point of the motion track exceeds a threshold, enable the screen of the display to present a preset animation effect with extension of the motion track.

In combination with the third possible implementation manner of the third aspect, in a fourth possible implementation manner, the processor is further configured to: when the screen of the display exits the screen saver state, enable the screen of the display to end the preset animation effect.

In combination with the third aspect and any one of the above possible implementation manners, in a fifth possible implementation manner, the processor is further configured to: when the screen of the display exits the screen saver state, enable the screen of the display to present an interface before startup of the screen saver or a main interface.

In combination with the third aspect and any one of the above possible implementation manners, in a sixth possible implementation manner, the processor is further configured to send an instruction to the display when the screen of the display is in the screen saver state, so that the display enables, according to the instruction, the screen of the display to present the first area of the screen and the second area of the screen distinctively.

In combination with the third aspect and any one of the above possible implementation manners, in a seventh possible implementation manner, the screen of the display is a touch screen, and accordingly, the motion track is a touch track input by the user on the touch screen.

With the above technical solutions, characteristics of the motion track on the screen are detected, for example, the number of times of crossing the boundaries of the first area and second area of the screen; therefore, the screen saver can be unlocked based on the flexibly input motion track, so that the screen saver can be unlocked more flexibly.

BRIEF DESCRIPTION OF THE DRAWINGS

To illustrate the technical solutions in the embodiments of the present invention more clearly, the following briefly describes the accompanying drawings required for describing the embodiments of the present invention. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention. Apparently, the embodiments in the following description are merely a part rather than all of the embodiments of the present invention. All other embodiments obtained by persons of ordinary skill in the art based on the embodiments in the present invention without creative efforts shall fall within the protection scope of the present invention.

At present, there is a method for unlocking a screen saver for a user equipment as follows: selecting a specified unlocking icon, and sliding from one end of the user equipment to another end along a given track. When all users use the method, the method not only is inflexible, but also is monotonous and presents no personality. An embodiment of the present invention provides a method to flexibly unlock a screen saver.

Figure 1:
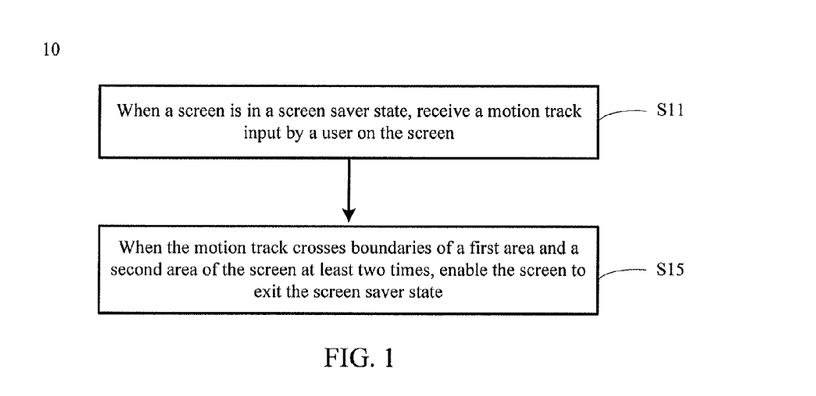
FIG. 1 is a schematic flowchart of a method for unlocking a screen saver according to an embodiment of the present invention.

FIG. 1 is a schematic flowchart of a method 10 for unlocking a screen saver according to an embodiment of the present invention. The method 10 includes the following content.

S11. When a screen is in a screen saver state, receive a motion track input by a user on the screen.

Herein, the user inputs the motion track on the screen, and the inputting includes, but is not limited to, inputting through a key board, a mouse, or handwriting, or through an external interface.

S15. When the motion track crosses boundaries of a first area and a second area of the screen at least two times, the screen exits the screen saver state.

The screen may be divided into two areas: the first area and the second area. There are various dividing methods, for example, dividing into two symmetric areas or dividing into two asymmetric areas. The motion track crossing the boundaries of the first area and the second area of the screen at least two times may include: switching from the first area to the second area then switching from the second area to the first area; or switching from the second area to the first area, and then switching from the first area to the second area, and even switching more than two times; or switching from the first area to the second area, and then switching from the first area to the second area, and even switching more than two times; or switching from the second area to the first area, and then switching from the second area to the first area, and even switching more than two times. It should be noted that the motion track may be continuous or may also be discontinuous. When the motion track is discontinuous, the time interval between two inputs needs to be further judged, wherein the two inputs means two inputs of motion track, and when the time interval between two inputs is within a preset time interval, it is determined that screen unlocking is required, or else, whether unlocking is required is not judged.

For example, when the area of the screen is divided into an upper area and a lower area which are symmetric to the middle line, the motion track may move from the upper area to the lower area, and then return from the lower area to the upper area. In addition, when the first area of the screen is an annular zone extending from an edge of the screen to the center of the screen, the motion track may move from one side inside the annular zone to the second area outside the annular zone of the screen, and then cross the second area to enter another side of the annular zone. In this case, the track input by a user on the screen may be in one direction, and it is more convenient for the user to input, which is different from the previous example.

In the embodiment of the present invention, characteristics of the motion track on the screen are detected, for example, the number of times of crossing the boundaries of the first area and second area of the screen; therefore, the screen saver can be unlocked based on the flexibly input motion track, so that the screen saver can be unlocked more flexibly.

Optionally, before unlocking the screen saver, the method further includes: detecting the start point and end point of the motion track; and when the start point and end point of the motion track are located in the first area of the screen, performing the step of unlocking the screen saver.

Optionally, the first area of the screen is an annular zone extending from an edge of the screen to the center of the screen.

Optionally, the start point of the motion track is located in the first area of the screen.

Optionally, before unlocking the screen saver, the method further includes: detecting a linear distance between the start point of the motion track and another point of the motion track; and when the linear distance between the start point of the motion track and the another point of the motion track exceeds a threshold, enabling the screen to present a preset animation effect with extension of the motion track.

Optionally, after the screen presents the preset animation effect, the method further includes: when the screen exits the screen saver state, enabling the screen to end the preset animation effect.

Optionally, after enabling the screen to end the preset animation effect when the motion track extends to the end point, the method further includes: when the screen exits the screen saver state, the screen presents an interface before startup of the screen saver or a main interface.

Optionally, the method further includes: when the screen is in the screen saver state, presenting the first area of the screen and the second area of the screen distinctively on the screen.

Optionally, the screen is a touch screen, and accordingly, the motion track is a touch track input by the user on the touch screen.

Figure 2:
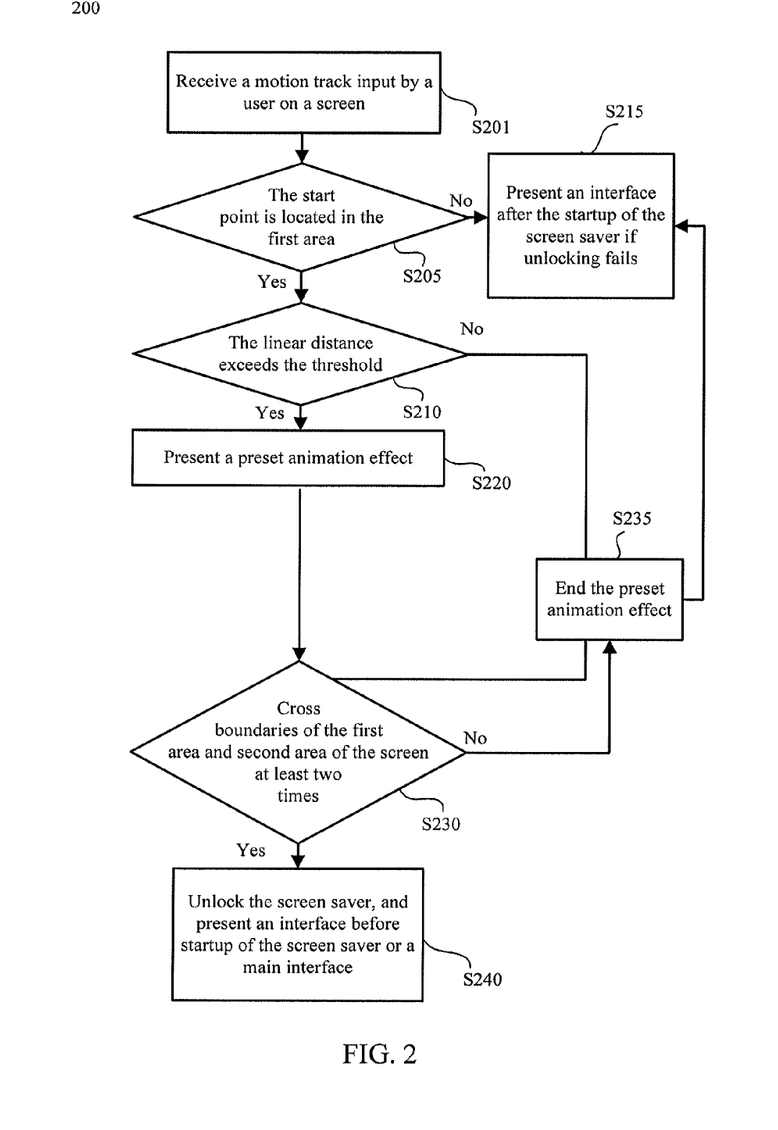
FIG. 2 is a schematic flowchart of a method for unlocking a screen saver according to another embodiment of the present invention.

FIG. 2 is a schematic flowchart of a method 200 for unlocking a screen saver according to another embodiment of the present invention. The method 200 includes the following content.

S201. When a screen is in a screen saver state, receive a motion track input by a user on the screen.

Through various input devices, what is continuously input by the user on the screen forms a motion track on the screen. The start of user input corresponds to the start point of the motion track, and the end of the user input corresponds to the end point of the motion track.

With the popularity of a touch screen in a user equipment, the operation of unlocking the screen saver for the user equipment becomes more direct. For the user equipment with a touch screen, the user input for unlocking the screen saver is a touch, where the touch track formed by the touch on the screen may be one kind of motion track in the embodiment of the present invention.

S205. Detect the start point of the motion track, and determine whether the start point of the motion track is located in the first area of the screen. If the start point of the motion track is located in the first area, that is, the determining result of S205 is "yes", S210 is performed. If the start point of the motion track is located in the second area outside the first area, that is, the determining result of S205 is "no", S215 is performed.

Figure 3:
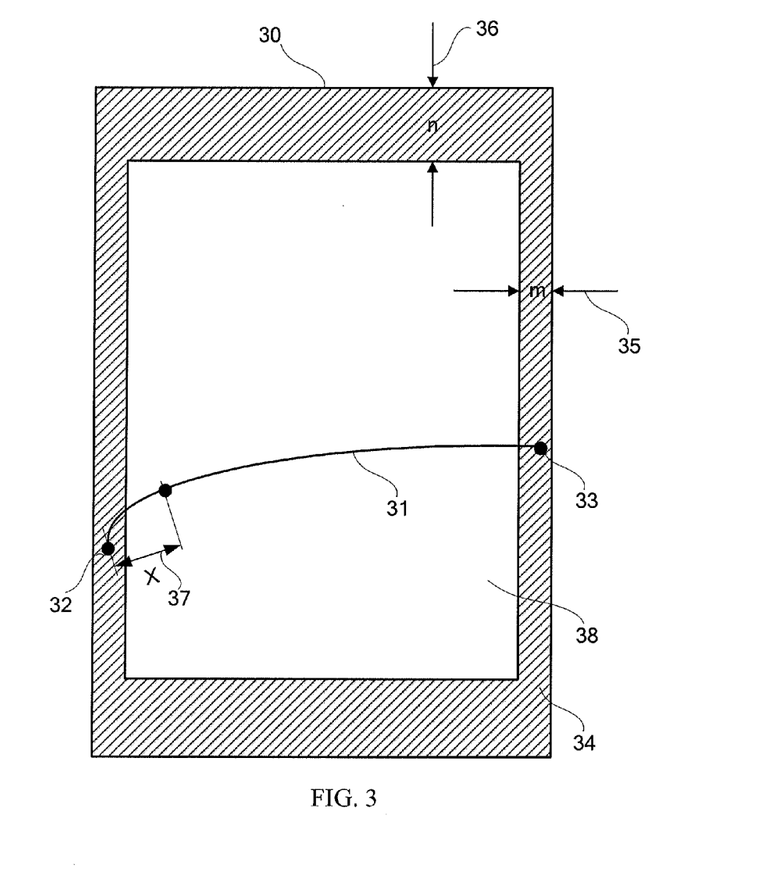
FIG. 3 is a schematic diagram of a screen according to an embodiment of the present invention.

FIG. 3 is a schematic diagram of a screen 30 according to an embodiment of the present invention. As shown in FIG. 3, the shape of the screen 30 may be rectangular or quasi-rectangular, and optionally, based on the specific characteristics of the screen of a user equipment, the shape of the screen may be the shape such as a square, a circle, or an oval. For convenience, herein a rectangular screen is used for illustration.

In the embodiment of the present invention, a motion track 31 moves from a start point 32 to an end point 33; a first area 34 of the screen is an annular zone extending from the edge of the screen 30 to the center of the screen; and the area outside the first area 34 in the screen is a second area 38. Usually, when the screen is in a screen saver state, the first area 34 and the second area 38 of the screen may be presented distinctively on the screen, so that the user conveniently learns the boundaries of the two areas and further implements inputting for unlocking. For example, at least one of the areas may be highlighted through blinking or a bold block to distinguish from the other area, or different areas may be displayed in different brightness or patterns to distinguish from each other. There are many methods for distinguishing two areas, and details are not further described herein. For ease of description, the first area 34 in FIG. 3 is highlighted by a shadow. Widths of the annular zone are a horizontal width 35 and a vertical width 36 shown in FIG. 3, and the threshold of the horizontal width is m and the threshold of the vertical width is n. m and n may be the same value or may also be different values. For example, for a mobile terminal, the length of the vertical side of the edge of the screen is greater than the length of the horizontal side of the edge of the screen shown in FIG. 3; therefore, the threshold m of the vertical width may be smaller than the threshold n of the horizontal width of the annular zone, so that a user can perform unlocking without dragging a long distance.

Figure 4A:
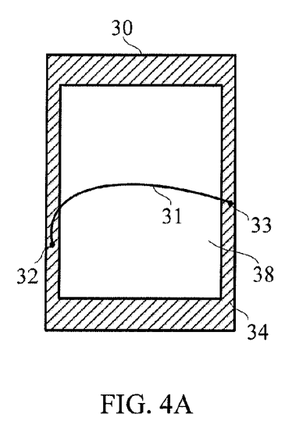
FIG. 4A to FIG. 4N are schematic diagrams of motion tracks according to an embodiment of the present invention.
Figure 4B:
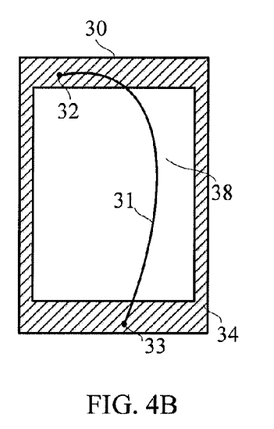
Figure 4C:
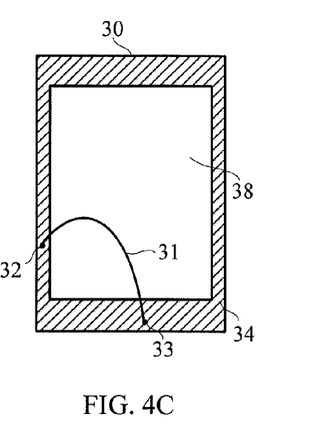
Figure 4D:
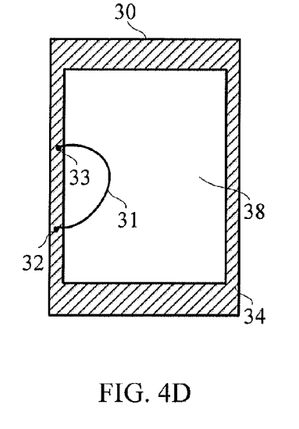
Figure 4E:
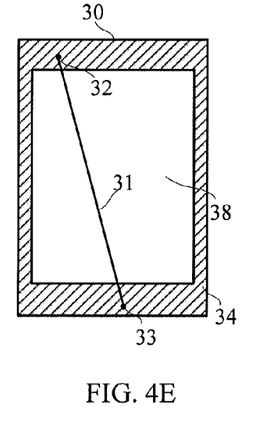
Figure 4F:
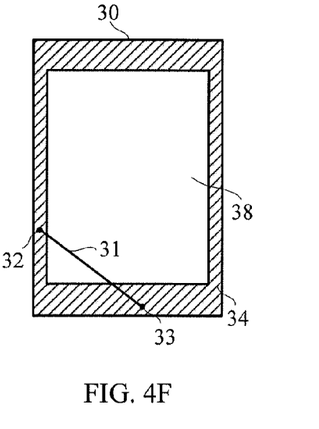
Figure 4G:
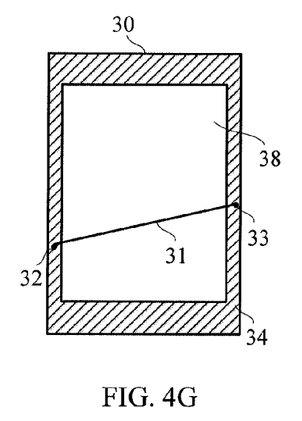
Figure 4H:
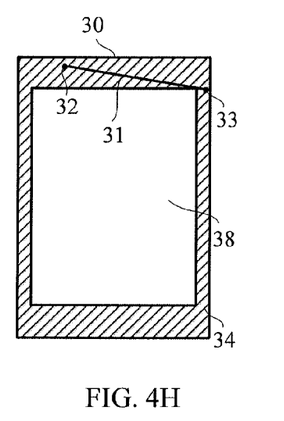
Figure 4I:
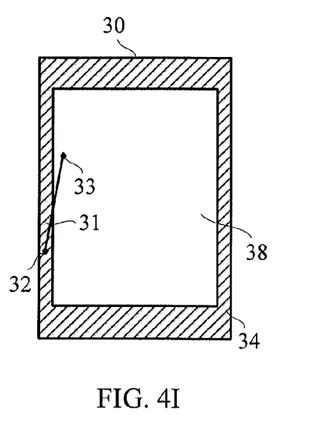
Figure 4J:
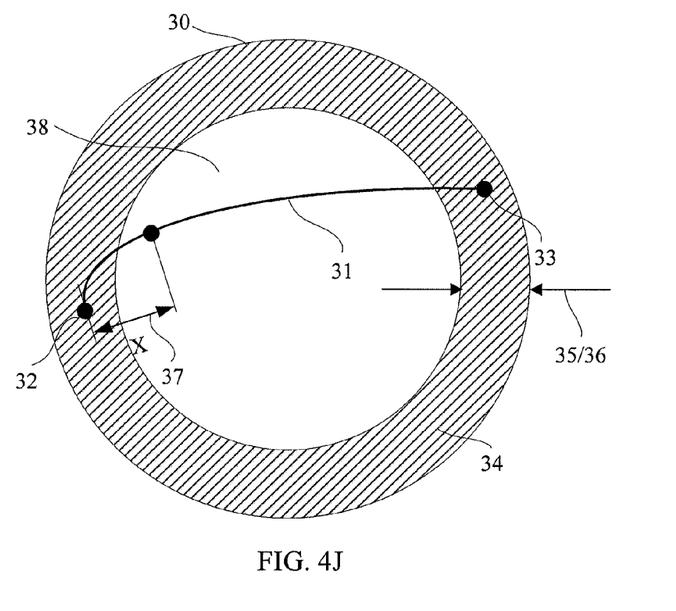

When the screen 30 is a square, the annular zone extending from the edge of the screen 30 to the center of the screen, namely, the first area, is a square annular zone, and the horizontal width of the annular zone is equal to the vertical width of the annular zone. When the screen 30 is a circle, the annular zone extending from the edge of the screen 30 to the center of the screen, namely, the first area, is a circle annular zone, as shown in FIG. 4J, the widths of the annular zone are equal.

FIG. 4A to FIG. 4I are schematic diagrams of a motion track 31 according to an embodiment of the present invention. As can be seen from the diagrams, diversity of the motion track reflects flexibility of control input for unlocking a screen saver; a new method for unlocking a screen saver is provided, and the design conception of the method is different from the prior art in which unlocking is performed along a given unlocking track.

S215. End an unlocking process if unlocking fails. At this time, an interface after startup of a screen saver is presented on the screen of a user equipment.

S210. Detect a linear distance between the start point of a motion track and another point of the motion track, and determine whether the linear distance between the start point of the motion track and the another point of the motion track exceeds a threshold.

Herein, the another point is a point after the start point on the motion track, and specially, the another point may be an end point. If the linear distance between the start point of the motion track and the another point of the motion track exceeds the threshold, that is, the determining result of S210 is "yes", S220 is performed.

Figure 5:
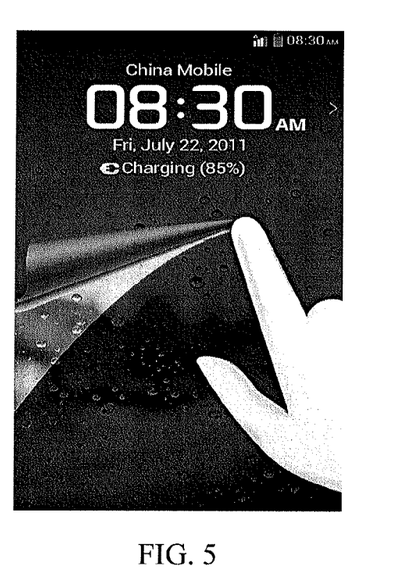
FIG. 5 is a schematic diagram of presenting a preset animation effect according to an embodiment of the present invention.

S220. When the linear distance between the start point of the motion track and the another point of the motion track exceeds a threshold, enable the screen to present a preset animation effect with extension of the motion track, as shown in FIG. 5.

The linear distance between the start point of the motion track 31 and the another point of the motion track is shown by 37 in FIG. 3, and the threshold x of the direction distance is a positive number. FIG. 5 is a schematic diagram of presenting a preset animation effect according to an embodiment of the present invention. In the schematic diagram, along the motion track input by a user, the interface of a current screen saver presents a torn animation effect. In this way, interest of interaction between a user and a user equipment may be enhanced.

If the linear distance between the start point of the motion track and the another point of the motion track does not exceed a threshold, that is, the determining result of S210 is "no", for example, until the another point of the motion track reaches the end point, if the linear distance between the start point and the end point of the motion track still does not exceed the threshold, S230 is performed.

After S220, S230 is performed.

Steps about the preset animation effect, for example, S210, S220, and S235, are optional, and may be implemented in the embodiment of the present invention in combination with the method 10.

S230. Determine whether the motion track crosses boundaries of the first area and the second area of the screen at least two times.

If the motion track crosses boundaries of the first area and the second area of the screen at least two times, for example, if the motion track moves from the first area to the second area and then from the second area to the first area, or moves from the second area to the first area and then from the first area to the second area, that is, the determining result of the S230 is "yes", S240 is performed, and for the motion track, reference may be made to FIG. 4A to FIG. 4G. If the motion track crosses boundaries of the first area and the second area of the screen less than two times, for example, if the motion track moves in the first area or the second area, or moves between the first area and the second area only once, that is, the determining result of S230 is "no", S235 is performed, and for the motion track, reference may be made to FIG. 4H or FIG. 4I.

Figure 4K:
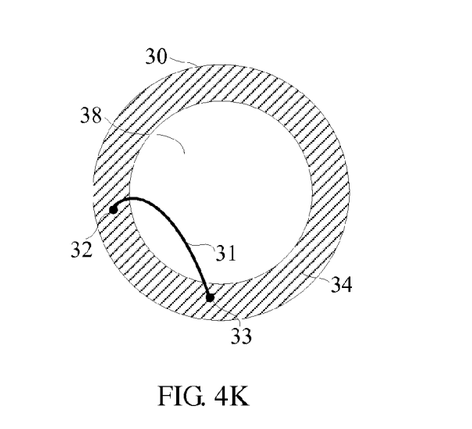
Figure 4L:
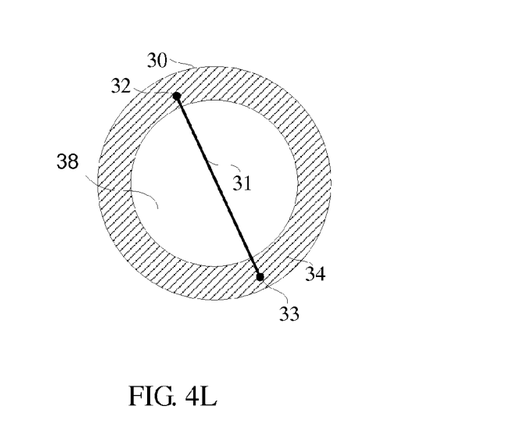
Figure 4M:
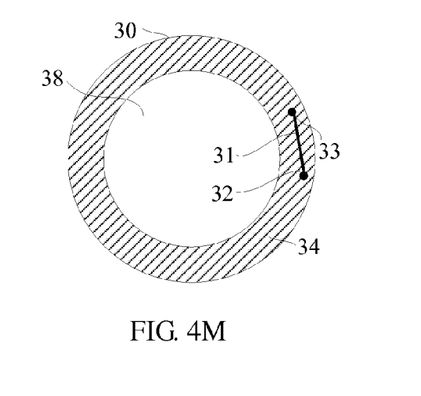
Figure 4N:
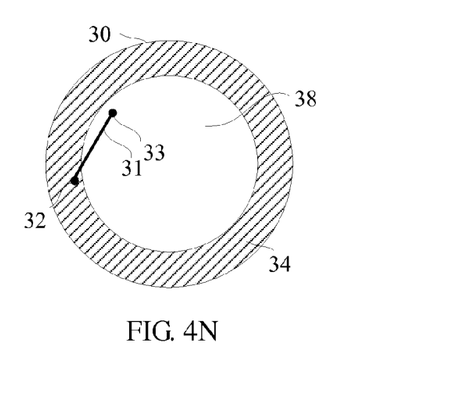

When the first area in the embodiment is a circle annular zone, if the motion track crosses boundaries of the first area and the second area of the screen less than two times, that is, if the motion track moves only in the first area or the second area, or moves between the first area and the second area only once, that is, the determining result of S230 is "no", for the motion track, reference is similarly made to FIG. 4M or FIG. 4N; if the motion track crosses boundaries of the first area and the second area of the screen at least two times, that is, the determining result of S230 is "yes", for the motion track, reference may be made to FIG. 4J to FIG. 4L.

S235. End the preset animation effect. Then, execute S215, and return to the locked screen state.

S240. Unlock a screen saver, and if an animation effect is presented previously, end the effect, and enable the screen to present the interface before startup of the screen saver, for example, a standby interface or another application interface such as a main interface, depending on the system setting of a user equipment.

In the embodiment of the present invention, characteristics of the motion track on the screen are detected, for example, the start point, and the number of times of crossing the boundaries of the first area and second area of the screen; therefore, the screen saver can be unlocked based on the flexibly input motion track, so that the screen saver can be unlocked more flexibly.

Figure 6A:
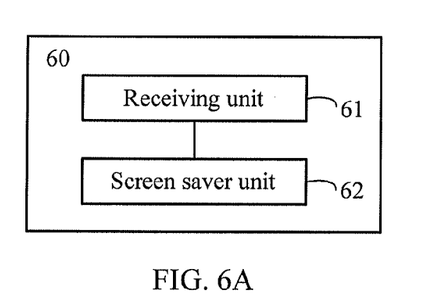
FIG. 6A and FIG. 6B are schematic block diagrams of apparatuses for unlocking a screen saver according to an embodiment of the present invention.
Figure 6B:
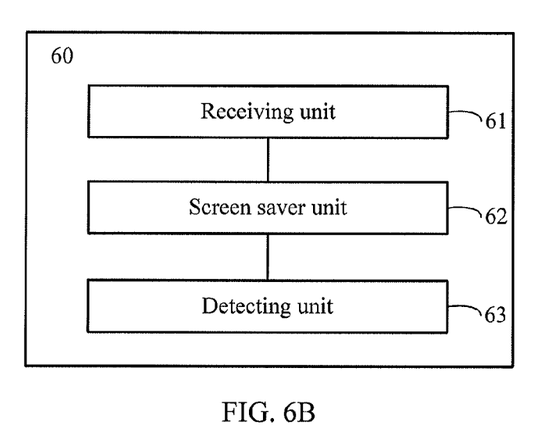

FIG. 6A and FIG. 6B are schematic block diagrams of an apparatus 60 for unlocking a screen saver according to an embodiment of the present invention.

The apparatus 60 in FIG. 6A includes: a receiving unit 61 and a screen saver unit 62.

When a screen is in a screen saver state, the receiving unit 61 receives a motion track input by a user on the screen, and sends the motion track to the screen saver unit.

The screen saver unit 62 enables the screen to exit the screen saver state when the motion track received by the receiving unit crosses boundaries of a first area and a second area of the screen at least two times.

With the apparatus in the embodiment of the present invention, characteristics of the motion track on the screen are detected, for example, the number of times of crossing the boundaries of the first area and second area of the screen; therefore, the screen saver can be unlocked based on the flexibly input motion track, so that the screen saver can be unlocked more flexibly.

In an optional embodiment, the apparatus 60 as shown in FIG. 6B may further include a detecting unit 63.

Optionally, the first area of a screen is an annular zone extending from an edge of the screen to the center of the screen.

Optionally, the start point of a motion track received by the receiving unit 61 is located in the first area of the screen.

Optionally, the detecting unit 63 detects a linear distance between the start point of the motion track and another point of the motion track; and when the linear distance between the start point of the motion track and the another point of the motion track exceeds a threshold, enables the screen to present a preset animation effect with extension of the motion track.

Optionally, the screen saver unit 62 further enables the screen to end the preset animation effect when the screen exits a screen saver state.

Optionally, when the screen exits the screen saver state, the screen saver unit 62 enables the screen to present an interface before startup of a screen saver or a main interface.

Optionally, when the screen is in the screen saver state, the screen saver unit 62 enables the screen to present the first area of the screen and the second area of the screen distinctively.

Optionally, the screen is a touch screen, and accordingly, the motion track is a touch track input by a user on the touch screen.

When the screen is in the screen saver state, the receiving unit of the apparatus 60 receives a motion track input by the user on the screen, and sends the motion track to the screen saver unit. The screen saver unit performs one or more of the following judgments according to characteristics of the motion track, for example, the start point of the motion track, and the number of times of crossing the boundaries of the first area and second area of the screen: for example, determining whether the start point of the motion track is located in the first area of the screen, determining whether the linear distance between the start point of the motion track and another point of the motion track exceeds a threshold, and determining the number of times of the motion track crossing the boundaries of the first area and second area of the screen, and so on, unlocks the screen saver, and sends an instruction to a displaying unit to enable the screen to present an interface before startup of the screen saver or a main interface. As shown in FIG. 3, the first area may be an annular zone extending from the edge of the screen to the center of the screen, and the motion track may be a touch track formed by control input on a touch screen. The apparatus 60 implements the above method 10 or 200, and for brevity, details are not described herein.

With the apparatus in the embodiment of the present invention, characteristics of the motion track on the screen are detected, for example, the start point, and the number of times of crossing the boundaries of the first area and second area of the screen; therefore, the screen saver can be unlocked based on the flexibly input motion track, so that the screen saver can be unlocked more flexibly; and by cooperating with presenting preset animation, the interest of unlocking is increased and user experience is enhanced.

Figure 7:
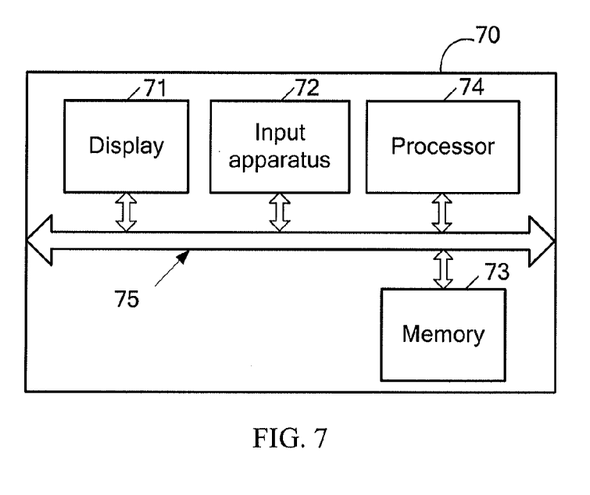
FIG. 7 is a schematic block diagram of an apparatus for unlocking a screen saver according to another embodiment of the present invention.

FIG. 7 is a schematic block diagram of an apparatus 70 for unlocking a screen saver according to another embodiment of the present invention.

The apparatus 70 includes a display 71, an input apparatus 72, a memory 73, a processor 74, and a bus 75.

The display 71 may be a suitable apparatus, such as a cathode ray tube (CRT, Cathode Ray Tube) display, a liquid crystal display (LCD, Liquid Crystal Display), or a touch screen (Touch Screen), and receives an instruction through the bus 75, so that a graphical user interface is presented on the screen of the display.

The input apparatus 72 may include any suitable apparatus, such as a key board, a mouse, a track recognizer, and a voice recognition interface, and is configured to receive the input of a user, and generate control input and send the control input to the processor or another component through the bus 75. Specially, when the display of the apparatus 70 has a touch screen, the display is also an input apparatus.

In addition, the memory 73 may be a RAM and a ROM, or any fixed storage medium, or a removable storage medium, and is configured to store the program that can execute the embodiment of the present invention or store the application database of the embodiment of the present invention, and receive, through the bus 75, the input of another component or the stored information invoked by another component, for example, a motion track.

The processor 74 is configured to execute the program of the embodiment of the present invention stored by the memory 73, and communicate with another apparatus through the bus in a bi-directional manner.

The memory 73 and the processor 74 may also be integrated into a physical module for applying the embodiment of the present invention, and in the physical module, the program for implementing the embodiment of the present invention is stored and run.

Components of the apparatus 70 are coupled together through the bus system 75, where the bus system 75 not only includes a data bus, but also includes a power bus, a control bus, and a state signal bus. For clear description, in the figure, various buses are all marked as a bus system 75.

In the embodiment of the present invention, units of the apparatus 70 execute the following content.

The display 71 receives an instruction of the processor, and enables the screen of the display to present a graphical user interface.

When the screen is in the screen saver state, the input apparatus 72 receives a motion track input by a user on the screen and sends the motion track to the memory 73, or receives the motion track input by the user on the screen and sends the motion track to the processor 74 which then sends the motion track to the memory 73.

The processor 74 receives the motion track sent by the input apparatus 72, and when the motion track crosses boundaries of the first area and the second area of the screen at least two times, enables the screen of the display to exit the screen saver state or sends the motion track to the memory 73.

The memory 73 stores the motion track sent by the input apparatus 72 or the motion track sent by the processor 74.

Optionally, the first area of the screen is an annular zone extending from the edge of the screen to the center of the screen.

Optionally, the processor is further configured to determine that the start point of the motion track is located in the first area of the screen.

Optionally, the processor is further configured to: detect a linear distance between the start point of the motion track and another point of the motion track; and when the linear distance between the start point of the motion track and the another point of the motion track exceeds a threshold, send an instruction to the display with extension of the motion track, so that the display enables, according to the instruction, the screen of the display to present a preset animation effect.

Optionally, the processor is further configured to send an instruction to the display when the screen of the display exits the screen saver state, so that the display enables, according to the instruction, the screen of the display to end the preset animation effect.

Optionally, the processor is further configured to send an instruction to the display when the screen of the display exits the screen saver state, so that the display enables, according to the instruction, the screen of the display to present an interface before startup of a screen saver or a main interface.

Optionally, the processor is further configured to send an instruction to the display when the screen of the display is in the screen saver state, so that the display enables, according to the instruction, the screen of the display to present the first area of the screen and the second area of the screen distinctively.

Optionally, the screen of the display is a touch screen, and accordingly, the motion track is a touch track input by the user on the touch screen.

When the screen is in the screen saver state, the input apparatus of the apparatus 70 receives the motion track input by the user on the screen, and sends the motion track to the memory and processor. The memory stores characteristics of the motion track, for example, the start point of the motion track, and the number of times of crossing the boundaries of the first area and second area of the screen. The processor performs one or more of the following judgments by reading the memory: for example, determining whether the start point of the motion track is located in the first area of the screen, determining whether the linear distance between the start point of the motion track and another point of the motion track exceeds a threshold, and determining the number of times of the motion track crossing the boundaries of the first area and second area of the screen, and so on, unlocks a screen saver, and sends an instruction to the display, so that the display enables, according to the instruction, the screen of the display to present an interface before startup of the screen saver or a main interface. As shown in FIG. 3, the first area may be an annular zone extending from the edge of the screen to the center of the screen, and the motion track may be a touch track formed by control input on the touch screen. The apparatus 70 implements the above method 10 or 200, and for brevity, details are not described herein.

With the apparatus in the embodiment of the present invention, characteristics of the motion track on the screen are detected, for example, the start point, and the number of times of crossing the boundaries of the first area and second area of the screen; therefore, the screen saver can be unlocked based on the flexibly input motion track, so that the screen saver can be unlocked more flexibly; and by cooperating with presenting preset animation, the interest of unlocking is increased and user experience is enhanced.

Persons of ordinary skill in the art should appreciate that, in combination with the examples described in the embodiments herein, units and algorithm steps can be implemented by electronic hardware, or a combination of computer software and electronic hardware. Whether the functions are executed by hardware or software depends on the specific applications and design constraint conditions of the technical solutions. Persons skilled in the art can use different methods to implement the described functions for every specific application, but it should not be considered that the implementation goes beyond the scope of the present invention.

It can be clearly understood by persons skilled in the art that, for the purpose of convenient and brief description, for the specific working processes of the foregoing system, apparatus and unit, reference may be made to the corresponding processes in the method embodiments, and details are not described herein again.

In the embodiments provided in the present application, it should be understood that the disclosed system, apparatus, and method may be implemented in other ways. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network elements. A part or all of the units may be selected according to actual needs to achieve the objectives of the solutions of the embodiments.

In addition, functional units in each embodiment of the present invention may be integrated into a processing unit, or each of the units may exist alone physically, or two or more units are integrated into a unit.

When being implemented in the form of a software functional unit and sold or used as a separate product, the functions may be stored in a computer-readable storage medium. Based on such understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, a network device, or the like) to execute all or part of the steps of the method described in each embodiment of the present invention. The storage medium includes: any medium that can store program codes, such as a U-disk, a removable hard disk, a read-only memory (ROM, Read-Only Memory), a random access memory (RAM, Random Access Memory), a magnetic disk, or an optical disk.

The foregoing description is merely about exemplary embodiments of the present invention, but not intended to limit the protection scope of the present invention. Any variation or replacement easily derived by persons skilled in the art within the technical scope disclosed by the present invention shall fall within the protection scope of the present invention. Therefore, the protection scope of the present invention shall be subject to the appended claims.

What is claimed is:

1. A method for deactivating a screen lock executed by a mobile electronic device, the electronic device including a touch-sensitive display, the method comprising:
   detecting a moving contact gesture with the touch-sensitive display within a first display area of the display, wherein the first display area is a frame region that surrounds a second display area and the first display area extends from one or more edges of the display;
   determining that a path of the moving contact gesture crosses a boundary between the first display area of the display and the second display area of the display at least twice, wherein the second display area is contiguous to the first area and the boundary is a common edge by which the first and second display areas are contiguous; and
   based upon the determination, deactivating the screen lock.

2. The method according to claim 1, wherein the first display area of the display is an annular zone extending from one or more edges of the display toward the center of the display.

3. The method according to claim 1, further comprising:
   detecting the path of the moving contact gesture,
   determining that a distance of the path of the moving contact gesture exceeds a threshold, and
   activating an animation effect according to the path of the moving contact gesture.

4. The method according to claim 3, further comprises:
   deactivating the animation effect when the screen lock is deactivated.

5. The method according to claim 1, further comprising:
   when the display is in the screen lock state, presenting the first display area of the display and the second display area of the display distinctively on the display.

6. A mobile electronic apparatus for deactivating a screen-lock, comprising:

a touch-sensitive display;
a memory; and
a processor coupled to the memory and configured to:
> detect a moving contact gesture with the touch-sensitive display within a first display area of the display, wherein the first display area is a frame region that surrounds a second display area and the first display area extends from one or more edges of the display,
>
> determine that a path of the moving contact gesture crosses a boundary between the first display area of the display and the second display area of the display at least twice, wherein the second display area is contiguous to the first area and the boundary is a common edge by which the first and second display areas are contiguous, and
>
> deactivate the screen lock based upon the determination.

7. The apparatus according to claim 6, wherein the first display area of the display is an annular zone extending from one or more edges of the display toward the center of the display.

8. The apparatus according to claim 6, wherein the processor is further configured to:
  detect the path of the moving contact gesture;
  determine that a distance of the path of the moving contact gesture exceeds a threshold, and
  activate an animation effect according to the path of the moving contact gesture.

9. The apparatus according to claim 6, wherein the processor is further configured to present the first display area of the display and the second display area of the display distinctively on the display when the display is in the screen lock state.

* * * * *